United States Patent
Yamamoto et al.

(10) Patent No.: US 9,961,594 B2
(45) Date of Patent: May 1, 2018

(54) TERMINAL DEVICE, BASE STATION DEVICE, COMMUNICATIONS SYSTEM, AND COMMUNICATIONS METHOD

(71) Applicant: KDDI CORPORATION, Shinjuku-ku (JP)

(72) Inventors: Toshiaki Yamamoto, Tokyo (JP); Takeo Ohseki, Tokyo (JP); Xiaoqiu Wang, Tokyo (JP); Yosuke Akimoto, Tokyo (JP); Satoshi Konishi, Tokyo (JP)

(73) Assignee: KDDI Corporation, Tokyo (JP)

( * ) Notice: Subject to any disclaimer, the term of this patent is extended or adjusted under 35 U.S.C. 154(b) by 209 days.

(21) Appl. No.: 14/760,543

(22) PCT Filed: Jan. 15, 2014

(86) PCT No.: PCT/JP2014/050546
§ 371 (c)(1),
(2) Date: Jul. 13, 2015

(87) PCT Pub. No.: WO2014/112513
PCT Pub. Date: Jul. 24, 2014

(65) Prior Publication Data
US 2015/0358863 A1    Dec. 10, 2015

(30) Foreign Application Priority Data
Jan. 17, 2013 (JP) .................. 2013-006103

(51) Int. Cl.
*H04W 36/00* (2009.01)
*H04W 72/08* (2009.01)
(Continued)

(52) U.S. Cl.
CPC ....... *H04W 36/0027* (2013.01); *H04W 36/04* (2013.01); *H04W 36/30* (2013.01);
(Continued)

(58) Field of Classification Search
CPC .......... H04W 36/0027; H04W 76/025; H04W 36/30; H04W 72/085; H04W 72/08; H04W 36/04
See application file for complete search history.

(56) References Cited

U.S. PATENT DOCUMENTS 8,320,827 B2 * 11/2012 Adjakple ............... H04B 7/155
    455/7
8,892,109 B2 * 11/2014 Panchal ................ H04W 16/14
    370/329
(Continued)

FOREIGN PATENT DOCUMENTS

JP    2013-042264 A    2/2013
JP    2013-535177 A    9/2013
(Continued)

OTHER PUBLICATIONS

Qualcomm Incorporated, "Modelling of PCell change", 3GPP TSG-RAN WG2 #71 R2-104696. Madrid, Spain, Aug. 16, 2010. URL, http://www.3gpp.org/ftp/tsg_ran/WG2_RL2/TSGR2_71/Docs/R2-104696.zip.
(Continued)

*Primary Examiner* — Brian O'Connor
(74) *Attorney, Agent, or Firm* — Morgan, Lewis & Bockius LLP (57) ABSTRACT

A terminal device includes a wireless communication unit performing wireless communication; a connection control unit connecting to a first base station device to wirelessly communicate with the first base station device via the wireless communication unit, the first base station serving as a primary, the connection control unit connecting to a second base station device to wirelessly communicate with the second base station device via the wireless communication unit, the second base station device serving as a secondary; a detection unit determining whether quality of wireless
(Continued)

communication between the terminal device and the first base station device is in a low state based on a predetermined condition; and a signal transmission control unit wirelessly transmitting via the wireless communication unit, a predetermined signal toward at least either the first or second base station device when the quality is determined to be in the low state by the detection unit.

7 Claims, 5 Drawing Sheets

(51) Int. Cl.
  *H04W 76/02* (2009.01)
  *H04W 36/30* (2009.01)
  *H04W 36/04* (2009.01)

(52) U.S. Cl.
  CPC ......... *H04W 72/08* (2013.01); *H04W 72/085* (2013.01); *H04W 76/025* (2013.01)

(56) References Cited

U.S. PATENT DOCUMENTS

| | | | | |
|---|---|---|---|---|
| 9,007,933 B2* | 4/2015 | Wu | ................... | H04W 72/0406 370/252 |
| 9,088,902 B2* | 7/2015 | Ojala | ..................... | H04L 5/001 |
| 9,226,206 B2* | 12/2015 | Ishii | ..................... | H04W 8/082 |
| 9,414,299 B2* | 8/2016 | Adachi | ................ | H04W 12/06 |
| 9,445,335 B2* | 9/2016 | Fu | ......................... | H04J 3/0632 |
| 9,843,966 B2* | 12/2017 | Yasuda | ............ | H04W 36/0055 |
| 2012/0163338 A1 | 6/2012 | Zhang et al. | | |
| 2015/0009802 A1* | 1/2015 | Wager | ................ | H04W 76/027 370/218 |
| 2015/0282036 A1* | 10/2015 | Yi | .......................... | H04L 5/001 370/332 |

FOREIGN PATENT DOCUMENTS

| | | |
|---|---|---|
| JP | 2014-511640 A | 5/2014 |
| WO | 2012/006122 A1 | 1/2012 |
| WO | 2012/119626 A1 | 9/2012 |

OTHER PUBLICATIONS

Office Action dated Dec. 6, 2016, for corresponding Japanese Patent Application No. JP 2013-006103.
Communication from the European Patent Office dated Jul. 20, 2016 in counterpart European application No. 14741184.7.
Notel, "Inter eNB handover in a synchronous network," 3GPP TSG RAN WG2#58bis, Jun. 25-29, 2007, Orlando Florida, pp. 1-5.
Nokia Siemens Networks, Nokia Corporation, "PCC Selection at Handover," 3GPP TSG-RAN WG2 Meeting #70, Montreal, Canada, May 10-14, 2010, pp. 1-2.
3GPP TS36.300 v11.3.0, E-UTRA and E-UTRAN overall description, Sep. 2012.
NTT Docomo Inc., Requirements, Candidate Solutions & Technology Roadmap for LTE Rel-12 Onward, 3GPP Workshop on Release 12 and onwards, RWS-120010, Jun. 11-12, 2012.
3GPP TS36.331 v11.1.0, E-UTRA RRC Protocol specification, Sep. 2012.
Kengo Yagyu et al., A Study on Management Technique of Carrier Aggregation in LTE-Advanced, IEICE Technical Report, Feb. 23, 2011, vol. 110, No. 433, pp. 145-150, ISSN 0913-5685.
3GPP TS 36.300 V11.4.0, Dec. 2012, pp. 64-67, [online], [retrieved on Mar. 17, 2014], Retrieved from the Internet <URL: http//www.qtc.jp/3GPP/Specs/36300-b40.pdf>.
International Search Report dated Apr. 1, 2014, for International application No. PCT/JP2014/050546.
TSG-RAN Chairman, Summary of 3GPP TSG-RAN Workshop on Release 12 and Onward, 3GPP TSG-RAN#56 RP-120838, Jun. 13, 2012, URL, http://www.3gpp.org/ftp/tsg_ran/TSG_RAN/TSGR_56/Docs/RP-120838.zip.
Office Action dated Aug. 23, 2016, for corresponding Japanese Patent Application No. 2013-006103.

* cited by examiner

TERMINAL DEVICE, BASE STATION DEVICE, COMMUNICATIONS SYSTEM, AND COMMUNICATIONS METHOD

TECHNICAL FIELD

The present invention relates to a terminal device, a base station device, a communications system, and a communications method.

Priority is claimed on Japanese Patent Application No. 2013-006103, filed Jan. 17, 2013, the content of which is incorporated herein by reference.

BACKGROUND ART

In LTE-Advanced systems, which are being investigated for 3GPP, carrier aggregation (CA: Carrier Aggregation) techniques that simultaneously use a plurality of frequency bands (component carrier (CC: Component Carrier)) are employed with an object of improving the frequency utilization efficiency and the peak throughput (refer to Non-Patent Document 1).

In inter-site carrier aggregation (Inter-Site CA), which represents a form of carrier aggregation, a mobile terminal device (UE: User Equipment) simultaneously connects to a plurality of base station devices (eNB: E-UTRAN NodeB) that are installed at different locations. Further, the mobile terminal device communicates with the base station devices using a different frequency band (CC) for each base station device.

A network configuration is proposed in which, for the communication between base station devices and a mobile terminal device, the C-Plane and the U-Plane are separated and each is transmitted via different base station devices (refer to Non-Patent Document 2).

A macro base station device of a macro cell (Macro Cell) refers to a base station device that is deployed over a wide area, mainly for securing coverage for mobile terminal devices. As an example, a carrier frequency band such as an 800 MHz band is utilized. A small cell base station device of a small cell (Small Cell) refers to a base station device with a narrow coverage that is installed on a spot-by-spot basis for expanding the capacity. As an example, a high-frequency band such as a 3.4 GHz band is utilized.

In carrier aggregation, a base station device that manages the RRC (Radio Resource Control) connections between mobile terminal devices and base station devices is referred to as a PCell (Primary Cell). A base station device that is not a PCell is referred to as an SCell (Secondary Cell). The C-Plane represents a protocol for performing connection management and mobility control of mobile terminal devices. The U-Plane represents a protocol that relates to the transmission and reception of user traffic and scheduling information.

A downlink (DL: Down Link) represents communication in the direction from a base station device to a mobile terminal device. An uplink (UL: Up Link) represents communication in the direction from a mobile terminal device to a base station device.

PRIOR ART DOCUMENTS

Non-Patent Documents

[Non-Patent Document 1] 3GPP TS36.300 v11.3.0, "E-UTRA and E-UTRAN overall description", September 2012.

[Non-Patent Document 2] NTT DOCOMO INC., "Requirements, Candidate Solutions & Technology Roadmap for LTE Rel-12 Onward", 3GPP Workshop on Release 12 and onwards, RWS-120010, Jun. 11-12, 2012.

[Non-Patent Document 3] 3GPP TS36.331 v11.1.0 "E-UTRA RRC Protocol specification", September 2012.

SUMMARY OF THE INVENTION

Problem to be Solved by the Invention

Figure 7:
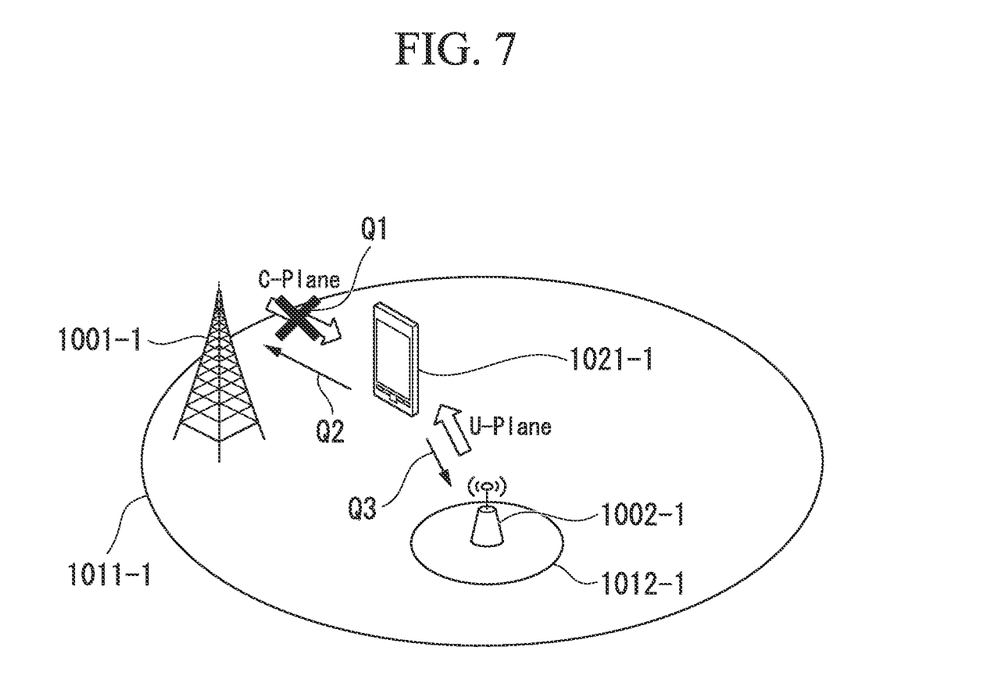
FIG. 7 is a diagram for describing an example of processing that, when the communication quality of a PCell deteriorates and the communication connection is disconnected, reconnects the communication.

FIG. 7 is a diagram for describing an example of processing that, when the communication quality of a PCell deteriorates and a communication connection is disconnected, reconnects the communication.

The communications system shown in FIG. 7 includes a macro base station device 1001-1, a small cell base station device 1002-1, and a mobile terminal device 1021-1. FIG. 7 shows a cell (communication region) 1011-1 of the macro base station device 1001-1, and a cell (communication region) 1012-1 of the small cell base station device 1002-1. In the example of FIG. 7, the cell 1012-1 of the small cell base station device 1002-1 is contained within the cell 1011-1 of the macro base station device 1001-1.

The following represent preconditions in the description. That is to say, with regards to the mobile terminal device 1021-1, the macro base station device 1001-1 represents the PCell. The macro base station device 1001-1 performs communication of C-Plane data (signals) with the mobile terminal device 1021-1. With regards to the mobile terminal device 1021-1, the small cell base station device 1002-1 represents the SCell. The macro base station device 1001-1 performs communication of U-Plane data (signals) with the mobile terminal device 1021-1. In the communications system, the following processing (B1) to (B3) is performed.

(B1): The communication quality between the mobile terminal device 1021-1 and the PCell deteriorates, and a disconnection of the communication connection between the mobile terminal device 1021-1 and the PCell occurs (refer to reference symbol Q1 in FIG. 7). As a result, irrespective of the communication quality between the mobile terminal device 1021-1 and the SCell, the connection between the mobile terminal device 1021-1 and the base station network becomes disconnected.

(B2): The mobile terminal device 1021-1 performs reconnection with the PCell (refer to reference symbol Q2 in FIG. 7). The mobile terminal device 1021-1 resets (disconnects) the connection with the SCell during reconnection processing with the PCell.

(B3): Consequently, in order to perform communication with the SCell, the mobile terminal device 1021-1 once again performs reconnection processing with the SCell (refer to reference symbol Q3 in FIG. 7).

In the processing (B1) to (B3) of the manner mentioned above, there is a problem in that the mobile terminal device 1021-1 is unable to communicate with the base station network once communication with the PCell is disconnected, until reconnection with a new base station device is completed. Furthermore, there is a problem in that an even longer time is needed for reconnection between the mobile terminal device 1021-1 and the SCell.

The present invention takes into consideration the above circumstances. An object of the present invention is to provide a terminal device, a base station device, a communications system, and a communications method that is able to reduce (or prevent) the occurrence of communication disconnections between the terminal device and a base station network.

Means for Solving the Problem (1): In order to solve the above problem, a terminal device according to an aspect of the present invention includes: a wireless communication unit that performs wireless communication; a connection control unit that connects to a first base station device so as to be able to wirelessly communicate with the first base station device via the wireless communication unit, the first base station serving as a primary, the connection control unit connecting to a second base station device so as to be able to wirelessly communicate with the second base station device via the wireless communication unit, the second base station device serving as a secondary; a detection unit that determines whether quality of wireless communication between the terminal device and the first base station device is in a low state based on a predetermined condition; and a signal transmission control unit that wirelessly transmits via the wireless communication unit, a predetermined signal toward at least either the first or second base station device when the quality is determined to be in the low state by the detection unit.

(2): In order to solve the above problem, a base station device according to an aspect of the present invention includes: a wireless communication unit that wirelessly communicates with a terminal device, the wireless communication unit receiving a predetermined signal from the terminal device in a state where the base station device is serving as a primary base station device and another base station device is serving as a secondary base station device; and an execution unit that executes handover between the base station device and the other base station device when the predetermined signal is received by the wireless communication unit.

(3): In order to solve the above problem, a communications system according to an aspect of the present invention includes: a terminal device; and first and second base station devices. The terminal device connects to the first base station device so as to be able to wirelessly communicate with the first base station device, the first base station device serving as a primary, the terminal device connecting to the second base station device so as to be able to wirelessly communicate with the second base station device, the second base station device serving as a secondary, the terminal device determining whether quality of wireless communication between the terminal device and the first base station device is in a low state based on a predetermined condition, the terminal device wirelessly transmitting a predetermined signal toward at least either the first or second base station device when the quality is determined to be in the low state, and the first base station device executes handover between the first base station device and the second base station device when the first base station device receives the predetermined signal from the terminal device.

(4): In the communications system according to abovementioned (3), the second base station device may be switched from a secondary base station device to a primary base station device, as a result of execution of the handover, and the terminal device may not execute random access with the second base station device during execution of the handover.

(5): In the communications system according to abovementioned (3) or abovementioned (4), the first base station device may transmit to the second base station device, identification information of the first base station device as information of a candidate for a new secondary base station device, and the first base station device may connect to the terminal device as a secondary base station device after completion of the handover.

(6): In the communication system according to abovementioned (5), the terminal device may not execute random access with the first base station device when the first base station device connects to the terminal device as a secondary base station device.

(7): In order to solve the above problem, a communications method according to an aspect of the present invention includes: connecting a terminal device and a first base station device such that the terminal device and the first base station device are able to wirelessly communicate with each other, the first base station device serving as a primary, and connecting the terminal device and a second base station device such that the terminal device and the second base station device are able to wirelessly communicate with each other; determining whether quality of wireless communication between the terminal device and the first base station device is in a low state based on a predetermined condition; wirelessly transmitting a predetermined signal from the terminal device toward the first base station device when the quality is determined to be in the low state; and executing handover between the first base station device and the second base station device when the predetermined signal is received by the first base station device.

Effect of the Invention

According to the present invention, the occurrence of communication disconnections between a terminal device and a base station network can be reduced (or prevented).

EMBODIMENTS FOR CARRYING OUT THE INVENTION

Hereunder, an embodiment of the present invention is described with reference to the drawings.

Configuration of Communications System According to Present Embodiment

The communications system according to the present embodiment is such that C-Plane data is transmitted and received via a PCell. Furthermore, U-Plane data is transmitted and received via either a PCell or an SCell, or both. The communications system according to the present embodiment is such that the macro base station device and the small cell base station device are respectively able to connect as a PCell, and are also able to connect as an SCell.

Figure 1:
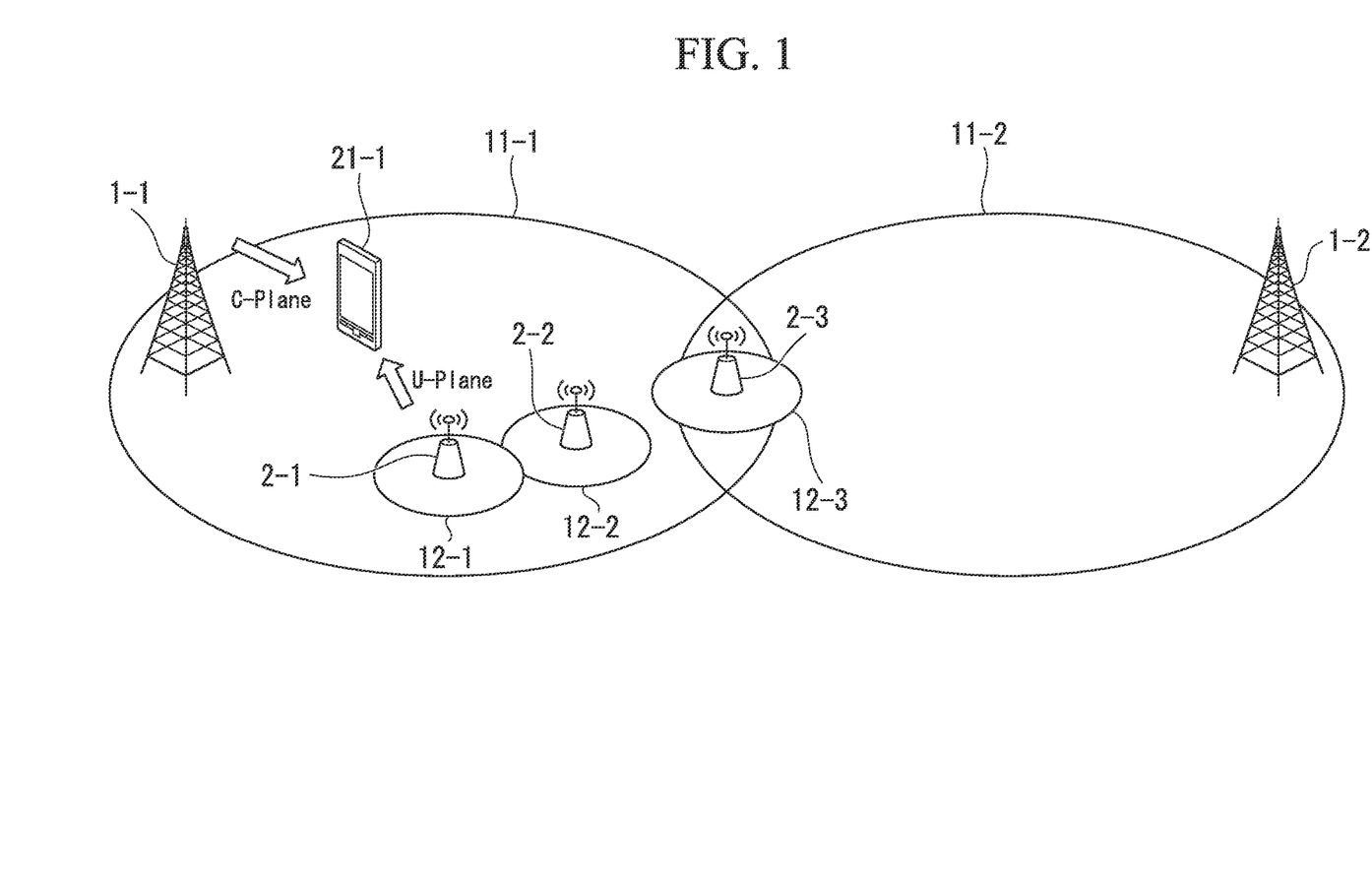
FIG. 1 is a block diagram showing a schematic configuration of a communications system according to an embodiment of the present invention.

FIG. 1 is a block diagram showing a schematic configuration of a communications system according to the embodiment of the present invention.

A communications system according the present embodiment includes a plurality (two are shown in the example of FIG. 1) of macro base station devices 1-1 and 1-2, a plurality (three are shown in the example of FIG. 1) of small cell base station devices 2-1 to 2-3, and a plurality (just one is shown in the example of FIG. 1) of mobile terminal devices (an example of a terminal device) 21-1. FIG. 1 shows cells (communication regions) 11-1 and 11-2 of the macro base station devices 1-1 and 1-2, and cells (communication regions) 12-1 to 12-3 of the small cell base station devices 2-1 to 2-3.

In the example of FIG. 1, the cells 12-1 and 12-2 of the small cell base station devices 2-1 and 2-2 are contained in the cell 11-1 of the macro base station device 1-1. The cells 11-1 and 11-2 of the two macro base station devices 1-1 and 1-2 and the cell 12-3 of the single small cell base station device 2-3 have mutually overlapping regions (areas).

The following represent preconditions in the description. That is to say, with regards to the mobile terminal device 21-1, the macro base station device 1-1 represents the PCell. The macro base station device 1-1 performs communication of C-Plane data (signals) with the mobile terminal device 21-1. With regards to the mobile terminal device 21-1, the small cell base station device 2-1 represents the SCell. The small cell base station device 2-1 performs communication of U-Plane data (signals) with the mobile terminal device 21-1.

In the present embodiment, the macro base station devices 1-1 and 1-2 and the small cell base station devices 2-1 to 2-3 are connected such that they are able to mutually directly or indirectly communicate. The communication may use a wired communication, or it may use a wireless communication for example.

The communications system according to the present embodiment is such that the mobile terminal device 21-1 is able to simultaneously communicate with the macro base station devices 1-1 and 1-2 and the small cell base station devices 2-1 to 2-3 using a C/U (C-Plane/U-Plane) separation.

In the communications system, the number of macro base station devices, the number of small cell base station devices, and the number of mobile terminal devices may respectively be varied.

Configuration of Mobile Terminal Device According to Present Embodiment

Figure 2:
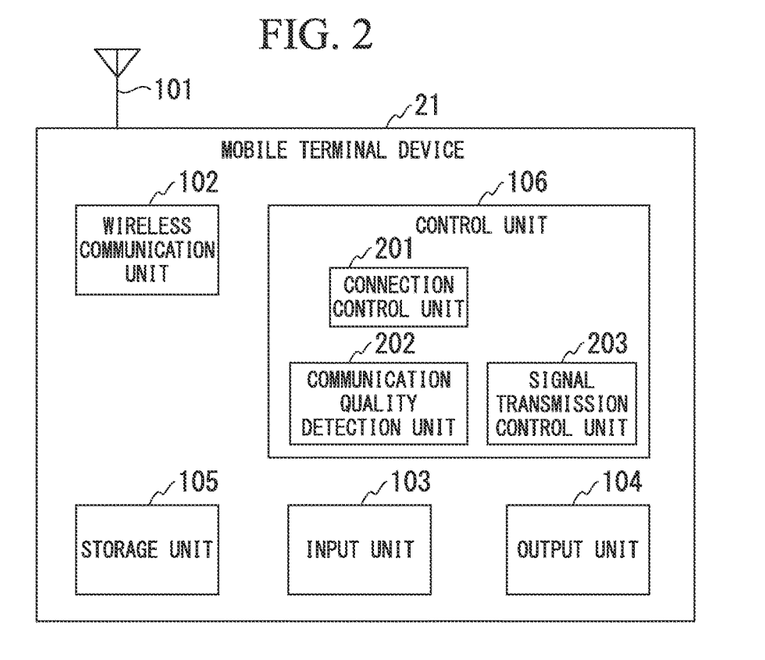
FIG. 2 is a block diagram showing a schematic configuration of a mobile terminal device according to the embodiment of the present invention.

FIG. 2 is a block diagram showing a schematic configuration of a mobile terminal device according to the embodiment of the present invention. In the present embodiment, each mobile terminal device has the same configuration and performs the same operations. Therefore, they are collectively described as a mobile terminal device 21.

The mobile terminal device 21 according to the present embodiment includes an antenna 101, a wireless communication unit 102, an input unit 103, an output unit 104, a storage unit 105, and a control unit 106.

The control unit 106 includes a connection control unit 201, a communication quality detection unit (in the following, sometimes referred to simply as a detection unit) 202, and a signal transmission control unit 203.

The antenna 101 communicates (transmits and receives) wireless signals.

The wireless communication unit 102 processes signals that are subject to transmission, and wirelessly transmits them from the antenna 101. The wireless communication unit 102 processes wireless signals that are received by the antenna 101. The wireless communication unit 102 wirelessly communicates with base station devices (the macro base station device 1-1 to 1-2 and the small cell base station devices 2-1 to 2-3 in the present embodiment) for example.

The input unit 103 accepts external inputs. The input unit 103 includes an operation unit that accepts operations performed by a user (person) for example. The operation unit is configured by a touch panel or keys for example. The input unit 103 includes an audio input unit that accepts the input of external sound (such as audio) for example. The input unit 103 includes for example, a data input unit that accepts data input from an external memory or device, and the like.

The output unit 104 performs output to the exterior. The output unit 104 includes for example, a display unit that displays information on a display. The display unit is configured by, for example, a liquid crystal display or the like. The output unit 104 includes for example, an audio output unit that outputs sound (such as audio) to the exterior. The output unit 104 includes for example, a data output unit that outputs data to an external memory or device, and the like.

The storage unit 105 stores a variety of information. The storage unit 105 is configured by a memory for example. The storage unit 105 stores a program that, for example, is processed by a processor such as the control unit 106, and the like.

The control unit 106 performs various processes and controls.

The connection control unit 201 connects via the wireless communication unit 102 such that it is able to wirelessly communicate with a primary base station device (the PCell in the present embodiment). Furthermore, the connection control unit 201 connects such that it is able to wirelessly communicate with a secondary base station device (the SCell in the present embodiment).

The detection unit 202 determines, based on a predetermined condition, whether or not the quality of wireless communication between the mobile terminal device 21 and the primary base station device is in a low state, and detects that the wireless communication quality is in a low state.

The signal transmission control unit 203 wirelessly transmits via the wireless communication unit 102, a predetermined signal toward a base station device, if the wireless communication quality is determined as being in a low state by the detection unit 202.

Configuration of Macro Base Station Device According to Present Embodiment

Figure 3:
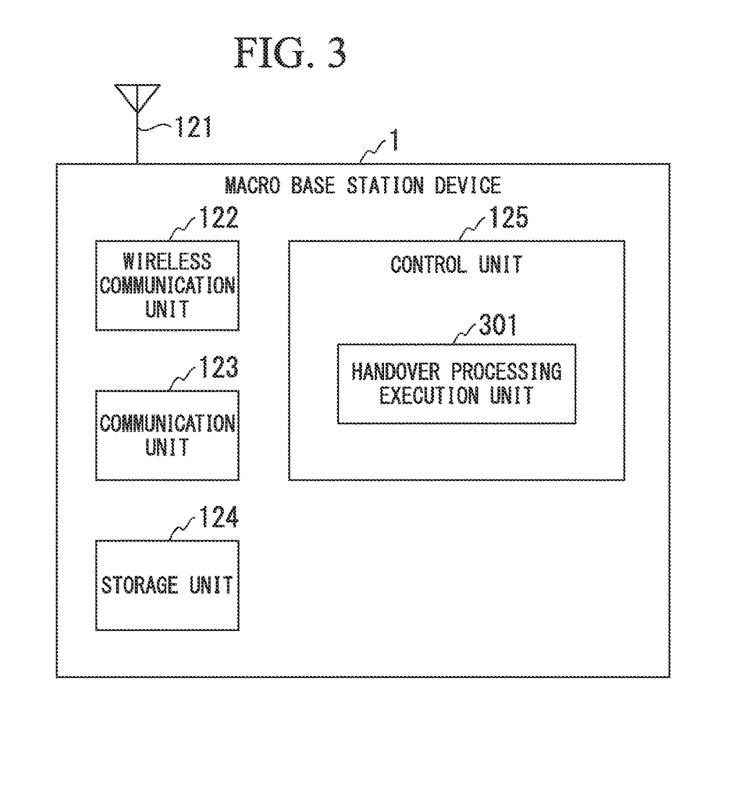
FIG. 3 is a block diagram showing a schematic configuration of a macro base station device according to the embodiment of the present invention.

FIG. 3 is a block diagram showing a schematic configuration of a macro base station device according to the embodiment of the present invention. In the present embodiment, each macro base station device has the same configuration and performs the same operations. Therefore, they are collectively described as a macro base station device 1.

The macro base station device 1 according to the present embodiment includes an antenna 121, a wireless communication unit 122, a communication unit 123, a storage unit 124, and a control unit 125.

The control unit 125 includes a handover processing execution unit (in the following, sometimes referred to as an execution unit) 301.

The antenna 121 communicates (transmits and receives) wireless signals.

The wireless communication unit 122 processes signals that are subject to transmission, and wirelessly transmits them from the antenna 121. The wireless communication unit 122 processes wireless signals that are received by the antenna 121. The wireless communication unit 122 wirelessly communicates with the mobile terminal device 21-1 for example.

The communication unit 123 communicates (transmits and receives) information with other base station devices (the macro base station devices and the small cell base station devices). This communication may be performed using a wired circuit, or it may be performed via a wireless circuit for example.

The storage unit 124 stores a variety of information. The storage unit 124 is configured by a memory for example. The storage unit 124 stores a program that, for example, is processed by a processor such as the control unit 125, and the like. The storage unit 124 stores, for example, information relating to the mobile terminal devices 21-1 that is connected to the macro base station device 1 such that wireless communication is possible (information for managing the mobile terminal device 21-1 for example).

The control unit 125 performs various processes and controls.

If the execution unit 301 receives the predetermined signal from the mobile terminal device 21-1 when it is connected such that wireless communication is possible with the mobile terminal device 21-1 as a primary base station device by means of the wireless communication unit 122, it executes handover processing between it and another base station device that is connected such that wireless communication is possible with the mobile terminal device 21-1 as a secondary base station device.

The wireless communication unit 122 may receive the predetermined signal from the mobile terminal device 21-1 in a state where the macro base station device 1 is operating as a primary base station device, and a small cell base station device 2 is operating as a secondary base station device. The execution unit 301 may execute handover processing between the macro base station device 1 and the small cell base station device 2 if the predetermined signal thereof is received by the wireless communication unit 122.

Configuration of Small Cell Base Station Device According to Present Embodiment

Figure 4:
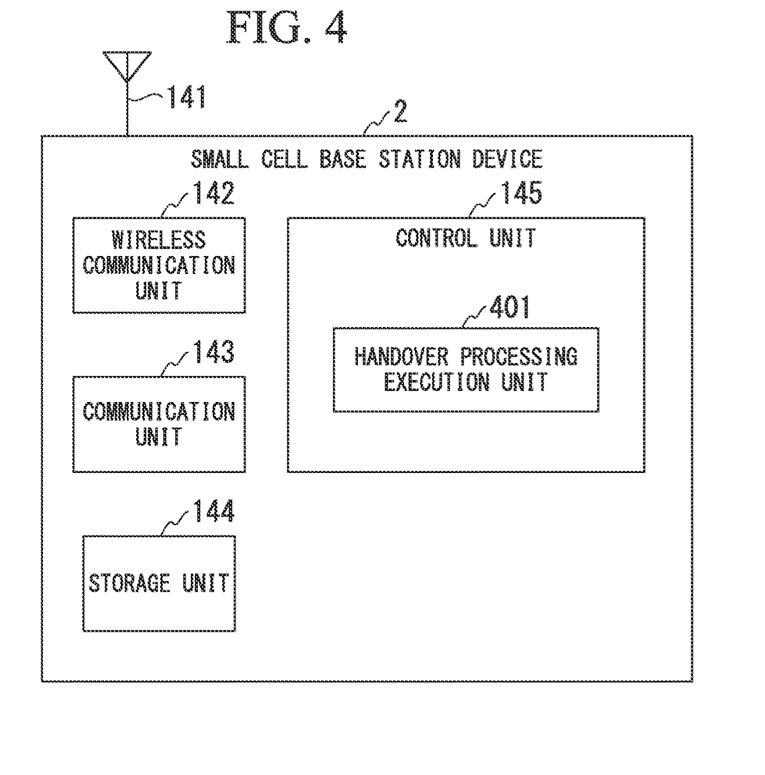
FIG. 4 is a block diagram showing a schematic configuration of a small cell base station device according to the embodiment of the present invention.

FIG. 4 is a block diagram showing a schematic configuration of a small cell base station device according to the embodiment of the present invention. In the present embodiment, each small cell base station device has the same configuration and performs the same operations. Therefore, they are collectively described as a small cell base station device 2.

The small cell base station device 2 according to the present invention includes an antenna 141, a wireless communication unit 142, a communication unit 143, a storage unit 144, and a control unit 145.

The control unit 145 includes a handover processing execution unit (in the following, sometimes referred to simply as an execution unit) 401.

The antenna 141 communicates (transmits and receives) wireless signals.

The wireless communication unit 142 processes signals that are subject to transmission, and wirelessly transmits them from the antenna 141. The wireless communication unit 142 processes wireless signals that are received by the antenna 141. The wireless communication unit 142 wirelessly communicates with the mobile terminal device 21-1 for example.

The communication unit 143 communicates (transmits and receives) information with the other base station devices (the macro base station devices and the small cell base station devices). This communication may be performed using a wired circuit, or it may be performed via a wireless circuit for example.

The storage unit 144 stores a variety of information. The storage unit 144 is configured by a memory for example. The storage unit 144 stores a program that, for example, is processed by a processor such as the control unit 145, and the like. The storage unit 144 stores, for example, information relating to the mobile terminal device 21-1 that is connected to the small cell base station device 2 such that wireless communication is possible (information for managing the mobile terminal device 21-1 for example).

The control unit 145 performs various processes and controls.

If the execution unit 401 receives the predetermined signal from the mobile terminal device 21-1 when it is connected such that wireless communication is possible with the mobile terminal device 21-1 as a primary base station device by means of the wireless communication unit 142, it executes handover processing between it and another base station device that is connected such that wireless communication is possible with the mobile terminal device 21-1 as a secondary base station device.

The wireless communication unit 142 may receive the predetermined signal from the mobile terminal device 21-1 in a state where the small cell base station device 2 is operating as a primary base station device, and the macro cell base station device 1 is operating as a secondary base station device. The execution unit 301 may execute handover processing between the small cell base station device 2 and the macro base station device 1 if the predetermined signal thereof is received by the wireless communication unit 122.

Processing Performed in Communications System According to Present Embodiment

Figure 5:
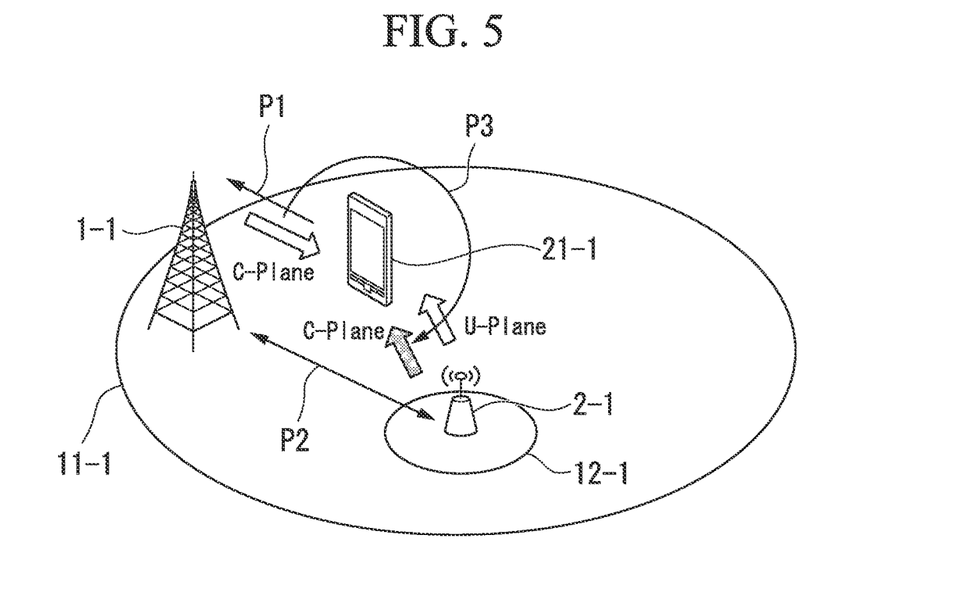
FIG. 5 is a diagram for describing an example of processing (a process for avoiding disconnection of a communication connection due to switching of a PCell and an SCell) that is performed in the communications system according to the embodiment of the present invention.

FIG. 5 is a diagram for describing an example of processing (a process that avoids disconnection of a communication connection due to switching of a PCell and an SCell) that is performed in a communications system according to the embodiment of the present invention.

FIG. 5 shows, as a configuration for describing the present processing, a macro base station device 1-1, a small cell base station device 2-1, a mobile terminal device 21-1, a cell 11-1 of the macro base station device 1-1, and a cell 12-1 of the small cell base station device 2-1.

The following represent preconditions in the description. That is to say, with regards to the mobile terminal device 21-1, the macro base station device 1-1 represents the PCell. The macro base station device 1-1 performs communication of C-Plane data (signals) with the mobile terminal device 21-1. With regards to the mobile terminal device 21-1, the small cell base station device 2-1 represents the SCell. The small cell base station device 2-1 performs communication of U-Plane data (signals) with the mobile terminal device 21-1.

In the communications system according to the present embodiment, schematically, if it is determined (detected) that the communication quality between the mobile terminal device 21-1 and the PCell has deteriorated, and it is determined that the communication quality between the mobile terminal device 21-1 and the SCell is good, information relating to the connection of the mobile terminal device 21-1 is exchanged between the PCell and the SCell, and the PCell and the SCell are exchanged as connection destinations.

As another configuration example, it is also possible to switch the connection of only the PCell, and to disconnect the connection between the mobile terminal device 21-1 and the SCell. In this case, after switching of the connection, the mobile terminal device 21-1 is connected to only the PCell.

As a specific example, the communications system according to the present invention performs the following processing (A1) to (A3).

(A1): The detection unit 202 monitors the quality of communication between the mobile terminal device 21-1 and the PCell (at this stage, the macro base station device 1-1), and the quality of communication between the mobile terminal device 21-1 and the SCell (at this stage, the small cell base station device 2-1). The detection unit 202 determines based on a predetermined condition whether or not the communication quality between the mobile terminal device 21-1 and the PCell has deteriorated. If the detection unit 202 determines (detects) that the notification quality with the PCell has deteriorated, the signal transmission control unit 203 notifies the PCell to this effect. In other words, by defining a triggering event (Triggering Event) utilizing the reception quality of two or more Cells (the PCell and the SCell), it becomes possible to utilize a cell having a high reception quality as the PCell with a more suitable timing. As a result, it becomes possible to stabilize the communication.

Consequently, the mobile terminal device 21-1 requests exchange of the PCell and the SCell prior to RLF (Radio Link Failure) of the PCell.

Here, as a monitoring condition for the communication quality of the PCell and a monitoring condition for the communication quality of the SCell, a triggering event based on a comparison of the reception quality of the PCell and the SCell, and a triggering event based on thresholds independently referenced by the PCell and the SCell, respectively, are introduced. Specifically, triggering events of two new measurement reports (MR: Measurement Report) are prescribed as follows. It is also acceptable for one of the triggering events of the two measurement reports to be used.

First Example of Triggering Event of Measurement Report

In the first example, schematically, a condition is used in which it is determined that the communication quality of the PCell has deteriorated if it is determined that the communication quality of the SCell exceeds the communication quality of the PCell by more than an offset value (or an adjustment value may also exist) and is good.

The example shown here is one in which, with respect to "5.5.4.4 Event A3 (Neighbour becomes offset better than PCell)" of Non-Patent Document 3, the value relating to "Neighbour" has been substituted by a value relating to the "SCell".

The condition (Entering Condition) for starting the transmission of a measurement report according to the first example is represented by Formula (1).

The condition (Leaving Condition) for aborting the transmission of a measurement report according to the first example is represented by Formula (2).

$$Mn+Ofn+Ocn-Hys>Mp+Ofp+Ocp+Off \quad \text{Formula (1)}$$

$$Mn+Oth+Ocn+Hys<Mp+Ofp+Ocp+Off \quad \text{Formula (2)}$$

Here, "Mn" represents a received power [dBm] or a reception quality [dB] of the SCell. "Ofn" represents a frequency offset of the SCell. "Ocn" represents an inherent offset with respect to the SCell. "Mp" represents a received power [dBm] or a reception quality [dB] of the PCell. "Ofp" represents an offset with respect to the primary frequency. "Ocp" represents a cell inherent offset of the PCell. "Hys" represents a hysteresis parameter. "Off" represents an offset inherent to the event (Event). The offset values are given in units of dB.

Second Example of Triggering Event of Measurement Report

In the second example, schematically, a condition is used in which the communication quality of the PCell is worse than a first threshold, and the communication quality of the SCell is better than a second threshold.

The example shown here is one in which, with respect to "5.5.4.6 Event A5 (PCell becomes worse than threshold 1 and neighbour becomes better than threshold 2)" of Non-Patent Document 3, the value relating to "Neighbour" has been substituted by a value relating to the "SCell".

In relation to the condition (Entering Condition) for starting the transmission of a measurement report according to the second example, condition 1 is represented by Formula (3), and condition 2 is represented by Formula (4).

In relation to the condition (Leaving Condition) for aborting the transmission of a measurement report according to the second example, condition 1 is represented by Formula (5), and condition 2 is represented by Formula (6).

$$Mp+Hys<\text{Thresh1} \quad \text{Formula (3)}$$

$$Mn+Ofn+Ocn-Hys>\text{Thresh2} \quad \text{Formula (4)}$$

$$Mp-Hys>\text{Thresh1} \quad \text{Formula (5)}$$

$$Mn+Oth+Ocn+Hys<\text{Thresh2} \quad \text{Formula (6)}$$

Here, "Mp" represents a received power [dBm] or a reception quality [dB] of the PCell. "Mn" represents a received power [dBm] or a reception quality [dB] of the SCell. "Ofn" represents a frequency offset of the SCell. "Ocn" represents an inherent offset with respect to the SCell. "Hys" represents a hysteresis parameter. "Thresh1" and "Thresh2" are respectively thresholds that are set with respect to "Mp" and "Mn". The thresholds are given in units of dB.

The value of "Thresh1", which represents the first threshold, and the value of "Thresh2", which represents the second threshold, may respectively be varied.

(A2): The PCell receives a notification (refer to reference symbol P1 in FIG. 5) relating to the deterioration in the communication quality of the PCell (at this stage, the macro base station device 1-1). In response to the notification, the process execution unit (here, the execution unit 301 of the macro base station device 1-1) starts handover (HO) processing between the PCell and the SCell (at this stage, the small cell base station device 2-1). The PCell and the SCell exchange information (refer to reference symbol P2 in FIG. 5).

Here, the SCell has previously established synchronization of an uplink (a link from the mobile terminal device 21-1 to the SCell). Consequently, in a handover procedure (Procedure) of the same manner as the technique shown in FIG. 6, the Synchronisation process of (S9) may be omitted for example.

(A3): The mobile terminal device 21-1 reconnects the small cell base station device 2-1 as the PCell. C-Plane signals are wirelessly transmitted from the small cell base station device 2-1, which represents the PCell, to the mobile terminal device 21-1 (refer to reference symbol P3 in FIG. 5).

The following processing may be performed in the handover processing of (A2) described above. That is to say, the PCell (at this stage, the macro base station device 1-1) notifies the SCell (at this stage, the small cell base station device 2-1) of its own base station number (PCI: Physical Cell Identifier) as a candidate for a new SCell. Following completion of handover processing, the original PCell (macro base station device 1-1) is immediately reconnected to the mobile terminal device 21-1 as the SCell. Here, in the reconnection processing with the original PCell, the original PCell has previously established synchronization of an uplink (a link from the mobile terminal device 21-1 to the original PCell). Consequently, the Synchronisation process of the same manner as shown in FIG. 6 (procedure S9) may be omitted for example.

Example of Handover Procedure

Figure 6:
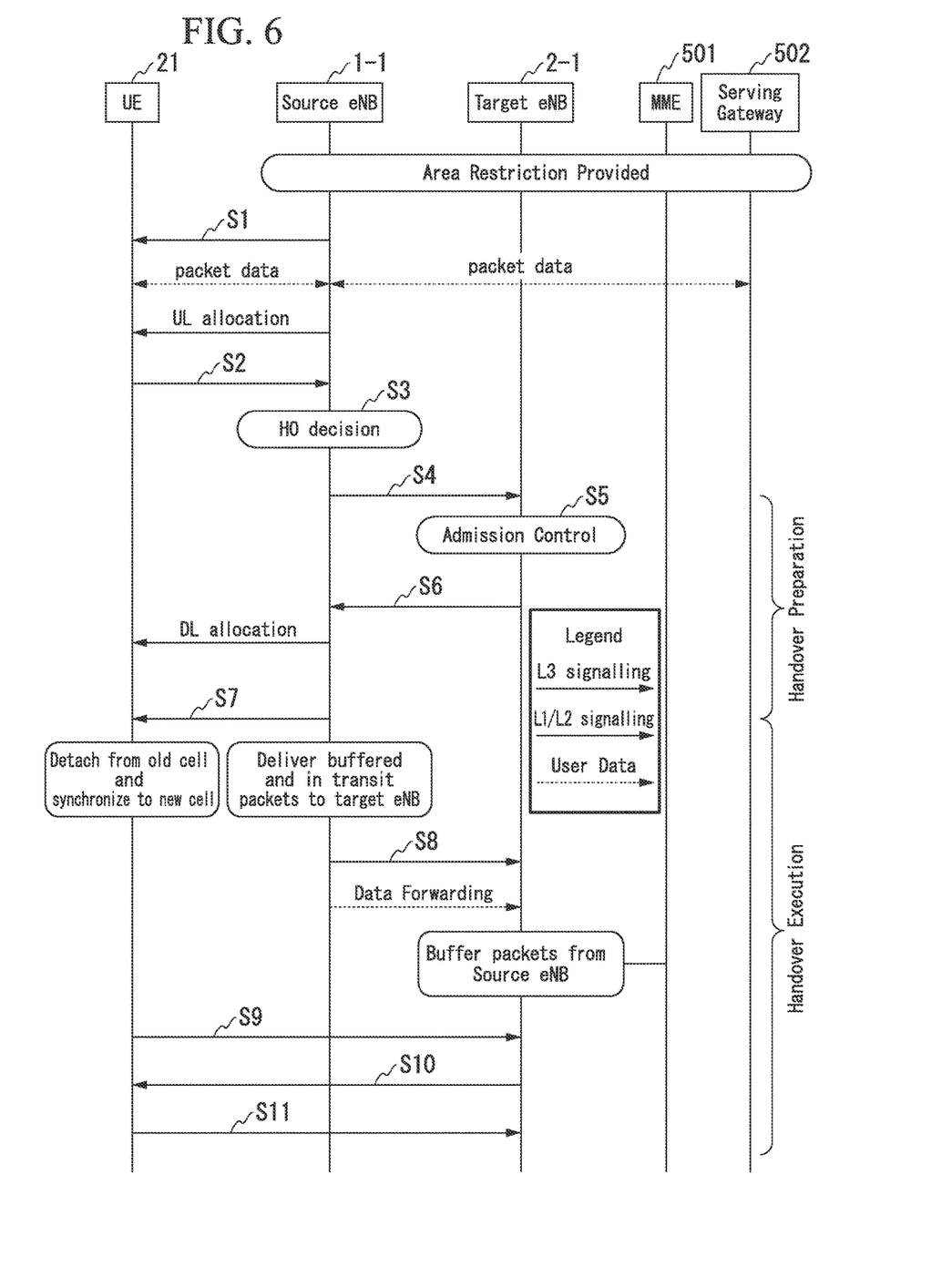
FIG. 6 is a sequence diagram showing an example of a handover procedure.

FIG. 6 is a sequence diagram showing an example of a handover procedure. The handover procedure according to the example of FIG. 6 corresponds to the procedure of "Figure 10.1.2.1.1-1: Intra-MME/Serving Gateway HO" of Non-Patent Document 1 (refer to Non-Patent Document 1 for details).

FIG. 6 shows an example of a handover procedure (procedure S1) to (procedure S11) performed with respect to a mobile terminal device (UE) 21, a base station device (eNB) 1-1 that becomes the handover origin (Source), a base station device (eNB) 2-1 that becomes the handover destination (Target), an MME (Mobility Management Entity) 501 that represents a high-order device, and a serving gateway (Serving Gateway) 502.

In this example, the base station device (eNB) 1-1 that serves as the handover origin (Source) is the macro base station device 1-1, and the base station device (eNB) 2-1 that serves as the handover destination (Target) is the small cell base station device 2-1.

A summary of the handover procedure shown in FIG. 6 is described.

(Procedure S1): The power measurement condition, the MR transmission condition, and the like, are notified from the base station device (the base station device of the handover source) 1-1, which is currently connected to the mobile terminal device 21, to the mobile terminal device 21 (Measurement Control).

(Procedure S2): When the MR transmission condition is satisfied, the mobile terminal device 21 notifies the power measurement result as an MR with respect to the currently connected base station device 1-1 (Measurement Reports).

(Procedure S3): The currently connected base station device 1-1 refers to the received MR, and determines whether or not a handover is to be executed (HO decision).

(Procedure S4): If a handover is to be executed, a handover execution is requested from the handover origin base station device 1-1 to the handover destination base station device 2-1 (Handover Request).

(Procedure S5): The handover destination base station device 2-1 determines whether or not to accept the handover (Admission Control).

(Procedure S6): If the handover execution is allowed, the permission for handover execution is notified from the handover destination base station device 2-1 to the handover source base station device 1-1 (Handover Request Ack).

(Procedure S7): The information necessary for the connections with the mobile terminal device 21 and the handover destination base station device 2-1 is transferred from the handover source base station device 1-1, and the handover destination base station device 2-1 is instructed to execute the handover (RRC conn. Reconf. incl. mobility Control information).

(Procedure S8): The untransmitted data is transferred from the handover source base station device 1-1 to the handover destination base station device 2-1 (SN Status Transfer).

(Procedure S9): The mobile terminal device 21 executes an uplink synchronization process (Non-contention random access procedure) with respect to the handover destination base station device 2-1 (Synchronisation).

(Procedure S10): A resource allocation for the uplink (UL: Up Link) is performed from the handover destination base station device 2-1 to the mobile terminal device 21 (UL allocation+TA for UE).

(Procedure S11): The mobile terminal device 21 notifies the connection completion to the handover destination base station device 2-1 (RRC conn. Reconf. Complete).

Summary of Configuration and Effect of Present Embodiment

As described above, in the communications system according to the present embodiment having a configuration in which the mobile terminal device 21-1 is able to wirelessly communicate by simultaneously connecting to a plurality of base station devices 1-1 and 2-1, if the communication quality with the base station device (the PCell in the present embodiment) responsible for connection management between the mobile terminal device 21-1 and the base station network deteriorates, the base station device (the PCell in the present embodiment) responsible for connection management with the base station network is switched with another connection base station device (the SCell in the present embodiment) with a better communication quality. As a result, the occurrence of communication disconnections is reduced (for example the occurrence of communication disconnections is obviated).

In the communications system according to the present embodiment, as an example, the mobile terminal device 21-1 transmits a notification message to the base station network if it detects that the received power (or the reception quality) of the SCell has exceeded the received power (or the reception quality) of the PCell by more than a predetermined offset (or a predetermined adjustment value may also exist).

As another example, the mobile terminal device 21-1 may transmit a notification message to the base station network if it detects that the received power (or the reception quality) of the PCell has fallen below a first threshold, and the received power (or the reception quality) of the SCell has exceeded a second threshold.

In the communications system according to the present embodiment, the PCell, which has received the notification message described above (the notification according to the one example described above, or the notification message according to the other example described above), executes handover with the SCell.

In the communications system according to the present invention, in such handover processing between the PCell and the SCell, the handover is executed without the mobile terminal device 21-1 performing a random access (Random access) procedure (procedure) with the SCell for example.

In the communications system according to the present invention, the PCell (the original PCell) notifies the SCell (the original SCell) of its own base station number (PCI) as a candidate for a new SCell during handover processing between the PCell and the SCell for example. Following completion of handover processing, the original PCell immediately reconnects to the mobile terminal device 21-1 as the SCell. Furthermore, in the reconnection processing with the original PCell, the mobile terminal device 21-1 executes reconnection with the original PCell as the SCell without performing a random access (Random access) procedure (procedure) with the original PCell for example.

As described above, in the communications system according to the present embodiment, the switching of the connections with the base station devices is such that the connection with the PCell having a deteriorated power quality is switched with the SCell having a good power quality prior to the occurrence of a communication disconnection between the mobile terminal device 21-1 and the PCell. As a result, the occurrence of communication disconnections between the mobile terminal device 21-1 and the base station network can be reduced (for example the occurrence of communication disconnections between the mobile terminal device 21-1 and the base station network can be prevented).

For example, the conventional technique requires a long time for reconnection between a mobile terminal device and a new base station device if a communication disconnection occurs. In contrast, in the communications system according to the present embodiment, the connection is switched to a base station device (SCell) in which both downlink/uplink connections have previously been established with the mobile terminal device 21-1 prior to the occurrence of a communication disconnection. Consequently, the time required for switching of the connection is short, and the effect on the communication performance of the mobile terminal device 21-1 is small.

Configuration Example According to Foregoing Embodiment

As a configuration example, a terminal device (in the foregoing embodiment, the mobile terminal device 21-1) includes: a wireless communication unit (in the foregoing embodiment, the wireless communication unit 102) that wirelessly communicates between base station devices (in the foregoing embodiment, the macro base station devices 1-1 to 1-2 and the small cell base station devices 2-1 to 2-3); a connection control unit (in the foregoing embodiment, the connection control unit 201) that, by means of the wireless communication unit, connects such that it is able to wirelessly communicate with a primary base station device (in the foregoing embodiment, the PCell), and also connects such that it is able to wirelessly communicate with a secondary base station device (in the foregoing embodiment, the SCell); a detection unit (in the foregoing embodiment, the detection unit 202) that, based on a predetermined condition, detects that the quality of wireless communication with the primary base station device is in a low state; and a signal transmission control unit (in the foregoing embodiment, the signal transmission control unit 203) that, if the state is detected by the detection unit, wirelessly transmits a predetermined signal to the base station device side (in the foregoing embodiment, the PCell or the SCell) by means of the wireless communication unit.

As a configuration example, a base station device (in the foregoing embodiment, the macro base station devices 1-1 to 1-2 and the small cell base station device 2-1 to 2-3) includes: a wireless communication unit (in the foregoing embodiment, the wireless communication units 122 and 142) that wirelessly communicates with the terminal device; and an execution unit (in the foregoing embodiment, the execution units 301 and 401) that, if a predetermined signal is received from the terminal device when it is connected as the primary base station device such that it is able to wirelessly communicate with the terminal device by means of the wireless communication unit, executes handover processing with another base station device that is connected as a secondary base station device such that it is able to wirelessly communicate with the terminal device.

As a configuration example, a communications system (in the foregoing embodiment, the communications system shown in FIG. 1) includes a terminal device and a plurality of base station devices. The terminal device connects such that it is able to wirelessly communicate with a primary base station device and also connects such that it is able to wirelessly communicate with a secondary base station device, and wirelessly transmits a predetermined signal to the base station device side if, based on a predetermined condition, the quality of wireless communication with the primary base station device is detected as being in a low state. The base station device is one that, if the predetermined signal is received from the terminal device when it is connected as the primary base station device such that it is able to wirelessly communicate with the terminal device, executes handover processing with another base station device that is connected as a secondary base station device such that it is able to wirelessly communicate with the terminal device.

As a configuration example, in the communications system, the handover processing is such that random access processing with the other base station device, which is to be switched from being the secondary base station device to a new primary base station device, is non-executable (in other words, it is not executed).

As a configuration example, in the communications system, the handover processing is such that the base station device that is switched from being the primary base station device to a new secondary base station device transmits identification information (numerical information for example) of its device (its own device) as information of a candidate for a new secondary base station device, to the other base station device, which is to be switched from being the secondary base station device to a new primary base station device, and following completion of the handover processing, the base station device that is switched from being the primary base station device to the new secondary base station device is connected to the terminal device as the secondary base station device.

As a configuration example, in the communications system, in the processing of connecting to the terminal device as the secondary base station device, the base station device that is switched from being the primary base station device to a new secondary base station device, random access processing between the secondary base station device and the terminal device is non-executable (in other words, it is not executed).

As a configuration example, a communications method (in the foregoing embodiment, a communications method performed in the communications system shown in FIG. 1) includes: a terminal device connecting to a primary base station device such that they are able to wirelessly communicate and connecting to a secondary base station device such that they are able to wirelessly communicate, and wirelessly transmitting a predetermined signal to the base station device side if, based on a predetermined condition, the quality of wireless communication with the primary base station device is detected as being in a low state; and if the base station device receives the predetermined signal from the terminal device when it is connected as the primary base station device such that it is able to wirelessly communicate with the terminal device, the base station device executing handover processing with another base station device that is connected as the secondary base station device such that it is able to wirelessly communicate with the terminal device.

As a configuration example, a terminal device includes: a wireless communication unit that performs wireless communication; a connection control unit that connects to a first base station device so as to be able to wirelessly communicate with the first base station device via the wireless communication unit, the first base station serving as a primary, the connection control unit connecting to a second base station device so as to be able to wirelessly communicate with the second base station device via the wireless communication unit, the second base station device serving as a secondary; a detection unit that determines whether quality of wireless communication between the terminal device and the first base station device is in a low state based on a predetermined condition; and a signal transmission control unit that wirelessly transmits via the wireless communication unit, a predetermined signal toward at least either the first or second base station device when the quality is determined to be in the low state by the detection unit.

As a configuration example, a base station device includes: a wireless communication unit that wirelessly communicates with a terminal device, the wireless communication unit receiving a predetermined signal from the terminal device in a state where the base station device is serving as a primary base station device and another base station device is serving as a secondary base station device; and an execution unit that executes handover between the base station device and the other base station device when the predetermined signal is received by the wireless communication unit.

As a configuration example, a communications system includes: a terminal device; and first and second base station devices. The terminal device connects to the first base station device so as to be able to wirelessly communicate with the first base station device, the first base station device serving as a primary, the terminal device connecting to the second base station device so as to be able to wirelessly communicate with the second base station device, the second base station device serving as a secondary, the terminal device determining whether quality of wireless communication between the terminal device and the first base station device is in a low state based on a predetermined condition, the terminal device wirelessly transmitting a predetermined signal toward at least either the first or second base station device when the quality is determined to be in the low state. The first base station device executes handover between the first base station device and the second base station device when the first base station device receives the predetermined signal from the terminal device.

As a configuration example, the second base station device is switched from a secondary base station device to a primary base station device, as a result of execution of the handover. The terminal device does not execute random access with the second base station device during execution of the handover.

As a configuration example, the first base station device transmits to the second base station device, identification information of the first base station device as information of a candidate for a new secondary base station device. The first base station device connects to the terminal device as a secondary base station device after completion of the handover.

As a configuration example, the terminal device does not execute random access with the first base station device when the first base station device connects to the terminal device as a secondary base station device.

As a configuration example, a communications method includes: connecting a terminal device and a first base station device such that the terminal device and the first base station device are able to wirelessly communicate with each other, the first base station device serving as a primary, and connecting the terminal device and a second base station device such that the terminal device and the second base station device are able to wirelessly communicate with each other; determining whether quality of wireless communication between the terminal device and the first base station device is in a low state based on a predetermined condition; wirelessly transmitting a predetermined signal from the terminal device toward the first base station device when the quality is determined to be in the low state; and executing handover between the first base station device and the second base station device when the predetermined signal is received by the first base station device.

Summary of Foregoing Embodiment

The foregoing has described the embodiment of the present invention with reference to the drawings. However the specific configurations are in no way limited to the embodiment. The present invention includes design changes and the like, without departing from the scope of the present invention.

A program for realizing the functions of the devices (the mobile terminal device and the base station devices for example) according to each of the embodiments described above may be recorded on a computer-readable recording medium, and the processing may be performed by making a computer system read the program recorded on the recording medium, and then executing it.

The "computer system" referred to here may include an operating system (OS: Operating System) and hardware such as peripheral devices.

The "computer-readable recording medium" may include a writable non-volatile memory such as a flexible disk, a magnetic optical disk, a ROM (Read Only Memory), a flash memory, and the like, a portable medium such as a DVD (Digital Versatile Disk), or a storage device such as a hard disk built-in to the computer system.

The "computer-readable recording medium" may, in a case where the program is transmitted via a network, such as the Internet, or a communication circuit, such as a telephone line, include those that retain the program for a fixed time, such as a volatile memory (DRAM (Dynamic Random Access Memory) for example) within the computer systems that become the server and the client.

The program mentioned above may be transmitted from a computer system storing the program in a storage device, and the like, to another computer system via a transmission medium or a transmission wave within the transmission medium. Here, the "transmission medium" that transmits the program refers to a medium having a function that transmits information, including a network (communication network) such as the Internet, and a communication circuit (communication line), such as a telephone line.

The program described above may be one that realizes a portion of the functions mentioned above.

The program described above may be one that realizes the functions mentioned above by being combined with a program that has previously been stored in the computer system, as a so-called difference file (difference program).

INDUSTRIAL APPLICABILITY

The present invention may be applied to terminal devices, base station devices, communications systems, and communications methods.

REFERENCE SYMBOLS

1, 1-1 to 1-2, 1001-1 Macro base station device
2, 2-1 to 2-3, 1002-1 Small cell base station device
11-1 to 11-2, 12-1 to 12-3, 1011-1, 1012-1 Cell (communication region)
21, 21-1, 1021-1 Mobile terminal device
101, 121, 141 Antenna
102, 122, 142 Wireless communication unit
103 Input unit
104 Output unit
105, 124, 144 Storage unit
106, 125, 145 Control unit
123, 143 Communication unit
201 Connection control unit
202 Communication quality detection unit (detection unit)
203 Signal transmission control unit
301, 401 Handover processing execution unit (execution unit)
501 MME
502 Serving gateway

The invention claimed is:

1. A terminal device comprising:
a wireless communication unit that performs wireless communication;
a connection control unit that connects to a first base station device so as to be able to wirelessly communicate with the first base station device via the wireless communication unit, the first base station serving as a primary, the connection control unit connecting to a second base station device so as to be able to wirelessly communicate with the second base station device via the wireless communication unit, the second base station device serving as a secondary;
a detection unit that determines, in a state where: the terminal device has established communication connections with both of the first base station device and the second base station device; the first base station device performs communication of C-Plane data with the terminal device; and the second base station device performs communication of U-Plane data with the terminal device, whether quality of wireless communication between the terminal device and the first base station device is in a low state based on a predetermined condition; and
a signal transmission control unit that wirelessly transmits via the wireless communication unit, a predetermined signal toward at least either the first or second base station device when the quality is determined to be in the low state by the detection unit.

2. A base station device comprising:
a wireless communication unit that wirelessly communicates with a terminal device, the wireless communication unit receiving a predetermined signal from the terminal device in a state where the base station device is serving as a primary base station device and another base station device is serving as a secondary base station device; and
an execution unit that starts handover between the primary base station device and the secondary base station device in a state where: the terminal device has established communication connections with both of the primary base station device and the secondary base station device; the primary base station device performs communication of C-Plane data with the terminal device; and the secondary base station device performs communication of U-Plane data with the terminal device when the predetermined signal is received by the wireless communication unit.

3. A communications system comprising: a terminal device; and first and second base station devices, wherein
the terminal device connects to the first base station device so as to be able to wirelessly communicate with the first base station device, the first base station device serving as a primary, the terminal device connecting to the second base station device so as to be able to wirelessly communicate with the second base station device, the second base station device serving as a secondary, the terminal device determining, in a state where: the terminal device has established communication connections with both of the first base station device and the second base station device; the first base station device performs communication of C-Plane data with the terminal device; and the second base station device performs communication of U-Plane data with the terminal device, whether quality of wireless communication between the terminal device and the first base station device is in a low state based on a predetermined condition, the terminal device wirelessly transmitting a predetermined signal toward at least either the first or second base station device when the quality is determined to be in the low state, and
the first base station device starts handover between the first base station device and the second base station device in a state where: the terminal device has established communication connections with both of the first base station device and the second base station device; the first base station device performs communication of C-Plane data with the terminal device; and the second base station device performs communication of U-Plane data with the terminal device when the first base station device receives the predetermined signal from the terminal device.

4. The communications system according to claim 3,
wherein the second base station device is switched from a secondary base station device to a primary base station device, as a result of execution of the handover, and
the terminal device does not execute random access with the second base station device during execution of the handover.

5. The communications system according to claim 3,
wherein the first base station device transmits to the second base station device, identification information of the first base station device as information of a candidate for a new secondary base station device, and
the first base station device connects to the terminal device as a secondary base station device after completion of the handover.

6. The communication system according to claim 5, wherein the terminal device does not execute random access with the first base station device when the first base station device connects to the terminal device as a secondary base station device.

7. A communications method comprising:
connecting a terminal device and a first base station device such that the terminal device and the first base station device are able to wirelessly communicate with each other, the first base station device serving as a primary, and connecting the terminal device and a second base station device such that the terminal device and the second base station device are able to wirelessly communicate with each other;
determining, in a state where: the terminal device has established communication connections with both of the first base station device and the second base station device; the first base station device performs communication of C-Plane data with the terminal device; and the second base station device performs communication of U-Plane data with the terminal device, whether quality of wireless communication between the terminal device and the first base station device is in a low state based on a predetermined condition;
wirelessly transmitting a predetermined signal from the terminal device toward the first base station device when the quality is determined to be in the low state; and
starting handover between the first base station device and the second base station device when the predetermined signal is received by the first base station device in a state where: the terminal device has established communication connections with both of the first base station device and the second base station device; the first base station device performs communication of C-Plane data with the terminal device; and the second base station device performs communication of U-Plane data with the terminal device.

* * * * *